(12) United States Patent
Hong et al.

(10) Patent No.: US 7,479,212 B2
(45) Date of Patent: Jan. 20, 2009

(54) METHOD OF MANUFACTURING HIGH-DENSITY DATA STORAGE MEDIUM

(75) Inventors: Seung-bum Hong, Seongnam (KR); In-kyeong Yoo, Suwon (KR); Ju-hwan Jung, Seoul (KR)

(73) Assignee: Samsung Electronics Co., Ltd., Suwon, Kyungki-Do (KR)

( * ) Notice: Subject to any disclaimer, the term of this patent is extended or adjusted under 35 U.S.C. 154(b) by 234 days.

(21) Appl. No.: 11/640,229

(22) Filed: Dec. 18, 2006

(65) Prior Publication Data

US 2007/0099309 A1 May 3, 2007

Related U.S. Application Data

(62) Division of application No. 10/610,540, filed on Jul. 2, 2003, now Pat. No. 7,170,843.

(30) Foreign Application Priority Data

Jul. 5, 2002 (KR) .................. 10-2002-0038881

(51) Int. Cl.
*C25D 1/00* (2006.01)
*C25D 11/02* (2006.01)

(52) U.S. Cl. .................. 205/68; 205/67; 205/171; 205/173; 205/190; 205/201

(58) Field of Classification Search .................. 205/67, 205/68, 79, 171, 173, 190, 201
See application file for complete search history.

(56) References Cited

U.S. PATENT DOCUMENTS

| | | | | |
|---|---|---|---|---|
| 5,626,687 A | * | 5/1997 | Campbell | 136/259 |
| 6,125,095 A | * | 9/2000 | Gemma et al. | 369/126 |
| 6,238,763 B1 | * | 5/2001 | Sandstrom | 428/64.1 |
| 6,811,607 B2 | * | 11/2004 | Akselrod | 117/19 |
| 6,850,480 B1 | * | 2/2005 | Naito et al. | 369/288 |
| 7,149,155 B2 | * | 12/2006 | Schut et al. | 369/13.54 |
| 2003/0081527 A1 | * | 5/2003 | Gibson et al. | 369/101 |

FOREIGN PATENT DOCUMENTS

| JP | 8-212604 | 8/1996 |
|---|---|---|
| JP | 8-274362 | 10/1996 |

* cited by examiner

*Primary Examiner*—Susy N Tsang-Foster
*Assistant Examiner*—William T Leader
(74) *Attorney, Agent, or Firm*—Buchanan Ingersoll & Rooney PC

(57) ABSTRACT

A high-density data storage medium, a method of manufacturing the data storage medium, a high-density data storage apparatus, and methods of writing data on, and reading and erasing data from the data storage medium by using the data storage apparatus are provided. The data storage medium includes a lower electrode, an insulation layer deposited on the lower electrode, a photoelectron emission layer deposited on the insulation layer and having a plurality of protrusions from which photoelectrons are emitted due to collisions between the protrusions and photons, and a dielectric layer deposited on the photoelectron emission layer and storing the photoelectrons emitted from the photoelectron emission layer. The data storage apparatus includes a stage supporting a data storage medium, which includes a lower electrode, an insulation layer deposited on the lower electrode, a photoelectron emission layer deposited on the insulation layer and having a plurality of protrusions from which photoelectrons are emitted due to collisions between the protrusions and photons, and a dielectric layer deposited on the photoelectron emission layer and storing the photoelectrons emitted from the photoelectron emission layer, a scanner driving the stage, a probe placed over the data storage medium and including a tip forming an electric field with the data storage medium and a cantilever supporting the tip placed at its one end so as to maintain a predetermined distance between the data storage medium and the tip, a circuit unit applying a driving signal, a data write signal, and a data erase signal to the scanner and the probe and detecting a data read signal, and a light source irradiating light on the data storage medium.

4 Claims, 7 Drawing Sheets

EFM 0518000D.HDF

CN7A.x 0518000C.HDF

METHOD OF MANUFACTURING HIGH-DENSITY DATA STORAGE MEDIUM

This application is a divisional of prior U.S. application Ser. No. 10/610,540 filed on Jul. 2, 2003 and claims priority under 35 U.S.C. § 120 to such prior application, the entire content of which is incorporated herein by reference. This application also claims priority under 35 U.S.C. § 119 to Korean Patent Application 10-2002-0038881 filed on Jul. 5, 2002, the disclosure of which is incorporated herein in its entirety by reference.

BACKGROUND OF THE INVENTION

1. Field of the Invention

The present invention relates to a high-density data storage medium using emission of electrons caused by photons, a method of manufacturing the data storage medium, a data storage apparatus, and methods of writing data on and reading and erasing data from the data storage medium.

2. Description of the Related Art

In accordance with the increasing demand for small-sized electronic devices, such as mobile communications terminals or electronic notebooks, development of ultra small-sized high-density data storage media and apparatuses are becoming more necessary. However, it is not easy to manufacture small-sized hard disks and to increase the integration density of flash memories. Therefore, research has been carried out on various techniques of writing data on a data storage medium using a scanning probe. Here, the scanning probe is a probe used for a scanning probe microscope (SPM), such as a scanning tunneling microscope (STM) or an atomic force microscope (AFM).

The data storage medium, on which data can be written using such a scanning probe, can be formed of a ferroelectric material, a ferromagnetic material, a thermoplastic resin, or a thermosetting resin. In particular, a great attention has been paid to a data storage medium formed of a ferroelectric material because of its small-sized domains and ability to quickly change a polarization direction.

Data can be written on a conventional data storage medium using a ferroelectric material by generating an electric field using a voltage applied to a lower electrode and a probe and thus dielectrically polarizing only some part of the data storage medium where the electric field has been generated. However, there is a limit in stably storing data in the data storage medium because of an aging phenomenon and a fatigue phenomenon. Here, the aging phenomenon indicates that as time goes by, such dielectric polarization continues to weaken and finally disappears, and the fatigue phenomenon indicates that as the number of times when data are written on and read from the data storage medium increases, the storage capacity of the data storage medium continues to decrease considerably.

In addition, during writing data on and reading data from the data storage medium using a scanning probe in contact with the data storage medium, the scanning probe and the data storage medium may wear each other out. In order to write data on and read data from the data storage medium using a scanning probe that is not in contact with the data storage medium, a data storage apparatus must be vacuum-packaged, and the vacuum packaging process may complicate the whole data writing and reading processes.

SUMMARY OF THE INVENTION

The present invention provides a high-density data storage medium on/from which data can be written/read and erased by applying a low electric field, while the data storage medium is in contact or out of contact with a scanning probe, a method of manufacturing the data storage medium, a data storage apparatus, and methods of writing data on, and reading and erasing data from the data storage medium.

According to an aspect of the present invention, there is provided a data storage medium using photoelectrons. The data storage medium includes a lower electrode, an insulation layer deposited on the lower electrode, a photoelectron emission layer deposited on the insulation layer and having a plurality of protrusions from which photoelectrons are emitted due to collisions between the protrusions and photons, and a dielectric layer deposited on the photoelectron emission layer and storing the photoelectrons emitted from the photoelectron emission layer.

Preferably, the photoelectron emission layer is formed of a metal.

Preferably, the dielectric layer is formed of an amorphous dielectric material.

Preferably, the dielectric layer is formed of alumina or silicon nitride.

According to another aspect of the present invention, there is provided a method of manufacturing a data storage medium. The method includes depositing a metal layer on a dummy electrode and forming a dielectric layer on which a plurality of holes are arranged by anodizing the metal layer, sequentially depositing a photoelectron emission layer, an insulation layer, and a lower electrode on the dielectric layer, and turning the resulting structure upside down so that the photoelectron emission layer to face upward and removing the dummy electrode.

Preferably, the photoelectron emission layer is formed of a metal.

Preferably, the dielectric layer is formed of an amorphous dielectric material.

Preferably, the dielectric layer is formed of alumina or silicon nitride.

According to another aspect of the present invention, there is provided a data storage apparatus using photoelectrons. The data storage apparatus includes a stage supporting a data storage medium, which includes a lower electrode, an insulation layer deposited on the lower electrode, a photoelectron emission layer deposited on the insulation layer and having a plurality of protrusions from which photoelectrons are emitted due to collisions between the protrusions and photons, and a dielectric layer deposited on the photoelectron emission layer and storing the photoelectrons emitted from the photoelectron emission layer, a scanner driving the stage, a probe placed over the data storage medium and including a tip forming an electric field with the data storage medium and a cantilever supporting the tip placed at its one end so as to maintain a predetermined distance between the data storage medium and the tip, a circuit unit applying a driving signal, a data write signal, and a data erase signal to the scanner and the probe and detecting a data read signal, and a light source irradiating light on the data storage medium.

Preferably, the tip is in contact or out of contact with the data storage medium.

Preferably, the tip includes a body doped with impurities, and source and drain electrodes doped with impurities of a high concentration and a predetermined distance apart in symmetry with each other.

Preferably, the tip includes a body doped with first impurities, a resistive region located at the peak of the tip and doped with second impurities of a low concentration, and source and drain electrodes located along the side of the tip, doped with the second impurities of a high concentration, and electrically connecting the resistive region to an external electrode.

Preferably, the first impurities are n-type impurities, and the second impurities are p-type impurities.

Preferably, the first impurities are p-type impurities, and the second impurities are n-type impurities.

Preferably, the photoelectron emission layer is formed of a metal.

Preferably, the dielectric layer is formed of an amorphous dielectric material.

Preferably, the dielectric material is alumina or silicon nitride.

According to another aspect of the present invention, there is provided a method of writing data, using photoelectrons, on a data storage medium comprising a lower electrode, an insulation layer deposited on the lower electrode, a photoelectron emission layer deposited on the insulation layer and having a plurality of protrusions from which photoelectrons are emitted due to collision between the protrusions and photons, and a dielectric layer deposited on the photoelectron emission layer and storing the photoelectrons emitted from the photoelectron emission layer by using a data storage apparatus comprising a stage supporting the data storage medium, a scanner driving the stage, a probe placed over the data storage medium and including a tip forming an electric field with the data storage medium and a cantilever supporting the tip placed at its one end so as to maintain a predetermined distance between the data storage medium and the tip, a circuit unit applying a driving signal, a data write signal, and a data erase signal to the scanner and the probe and detecting a data read signal, and a light source irradiating light on the data storage medium. The method of writing data, using photoelectrons, on a data storage medium includes placing the probe over the data storage medium and forming an electric field by applying voltage to the lower electrode of the data storage medium and the tip, and writing data on the data storage medium by irradiating light on the surface of the data storage medium where the electric field is formed so as to make photons collide with the photoelectron emission layer and storing photoelectrons emitted from the protrusions due to the collision between the protrusions and the photons in the dielectric layer.

Preferably, the tip is in contact or out of contact with the data storage medium.

Preferably, the tip includes a body doped with impurities, and source and drain electrodes doped with impurities of a high concentration and a predetermined distance apart in symmetry with each other.

Preferably, the tip includes a body doped with first impurities, a resistive region located at the peak of the tip and doped with second impurities of a low concentration, and source and drain electrodes located along the side of the tip, doped with the second impurities of a high concentration, and electrically connecting the resistive region to an external electrode.

Preferably, the first impurities are n-type impurities, and the second impurities are p-type impurities.

Preferably, the first impurities are p-type impurities, and the second impurities are n-type impurities.

Preferably, in forming the electric field, voltages of the same magnitude are respectively applied to the body of the tip, the source and drain electrodes.

Preferably, the photoelectron emission layer is formed of a metal.

Preferably, the dielectric layer is formed of an amorphous dielectric material.

Preferably, the dielectric material is alumina or silicon nitride.

According to another aspect of the present invention, there is provided a method of reading data written on a data storage medium comprising a lower electrode, an insulation layer deposited on the lower electrode, a photoelectron emission layer deposited on the insulation layer and having a plurality of protrusions from which photoelectrons are emitted due to collision between the protrusions and photons, and a dielectric layer deposited on the photoelectron emission layer and storing the photoelectrons emitted from the photoelectron emission layer by using a data storage apparatus comprising a stage supporting the data storage medium, a scanner driving the stage, a probe placed over the data storage medium and including a tip forming an electric field with the data storage medium and a cantilever supporting the tip placed at its one end so as to maintain a predetermined distance between the data storage medium and the tip, a circuit unit applying a driving signal, a data write signal, and a data erase signal to the scanner and the probe and detecting a data read signal, and a light source irradiating light on the data storage medium. The method of reading data written on a data storage medium includes placing the probe over the data storage medium and reading data from the data storage medium by detecting variations in the current of the tip caused by photoelectrons stored in the dielectric layer of the data storage medium.

Preferably, the tip is in contact or out of contact with the data storage medium.

Preferably, the tip includes a body doped with impurities, and source and drain electrodes doped with impurities of a high concentration and a predetermined distance apart in symmetry with each other.

Preferably, the tip includes a body doped with first impurities, a resistive region located at the peak of the tip and doped with second impurities of a low concentration, and source and drain electrodes located along the side of the tip, doped with the second impurities of a high concentration, and electrically connecting the resistive region to an external electrode.

Preferably, the first impurities are n-type impurities, and the second impurities are p-type impurities.

Preferably, the first impurities are p-type impurities, and the second impurities are n-type impurities.

Preferably, the photoelectron emission layer is formed of a metal.

Preferably, the dielectric layer is formed of an amorphous dielectric material.

Preferably, the dielectric material is alumina or silicon nitride.

According to another aspect of the present invention, there is provided a method of erasing data written on a data storage medium comprising a lower electrode, an insulation layer deposited on the lower electrode, a photoelectron emission layer deposited on the insulation layer and having a plurality of protrusions from which photoelectrons are emitted due to collision between the protrusions and photons, and a dielectric layer deposited on the photoelectron emission layer and storing the photoelectrons emitted from the photoelectron emission layer by using a data storage apparatus comprising a stage supporting the data storage medium, a scanner driving the stage, a probe placed over the data storage medium and including a tip forming an electric field with the data storage medium and a cantilever supporting the tip placed at its one end so as to maintain a predetermined distance between the data storage medium and the tip, a circuit unit applying a driving signal, a data write signal, and a data erase signal to the scanner and the probe and detecting a data read signal, and a light source irradiating light on the data storage medium. The method erasing data written on a data storage medium includes placing the probe over the data storage medium and erasing data from the data storage medium by applying to the tip voltage of the same magnitude as the one applied to the tip when writing data on the data storage medium in an opposite direction.

Preferably, the tip is in contact or out of contact with the data storage medium.

Preferably, the tip includes a body doped with impurities, and source and drain electrodes doped with impurities of a high concentration and a predetermined distance apart in symmetry with each other.

Preferably, the tip includes a body doped with first impurities, a resistive region located at the peak of the tip and doped with second impurities of a low concentration, and source and drain electrodes located along the side of the tip, doped with the second impurities of a high concentration, and electrically connecting the resistive region to an external electrode.

Preferably, the first impurities are n-type impurities, and the second impurities are p-type impurities.

Preferably, the first impurities are p-type impurities, and the second impurities are n-type impurities.

Preferably, the photoelectron emission layer is formed of a metal.

Preferably, the dielectric layer is formed of an amorphous dielectric material.

Preferably, the dielectric material is alumina or silicon nitride.

The present invention provides a data storage medium enabling photoelectrons to be temporarily kept in some part of an amorphous dielectric layer, a method of manufacturing the data storage medium, a data storage apparatus including a probe using a field effect transistor (FET), and methods of writing data on, and reading and erasing data from the data storage medium. Therefore, it is possible to write data on the data storage medium with a higher density while the data storage medium is in contact or out of contact with the probe, and to increase the life span of the data storage medium by preventing the data storage medium from being worn away when writing data on the data storage medium using a tip that is in contact or out of contact with the data storage medium.

BRIEF DESCRIPTION OF THE DRAWINGS

The above features and advantages of the present invention will become more apparent by describing in detail exemplary embodiments thereof with reference to the attached drawings in which.

DETAILED DESCRIPTION OF THE INVENTION

Hereinafter, the present invention will be described in greater detail with reference to the accompanying drawings in which preferred embodiments of the invention are shown.

Figure 1:
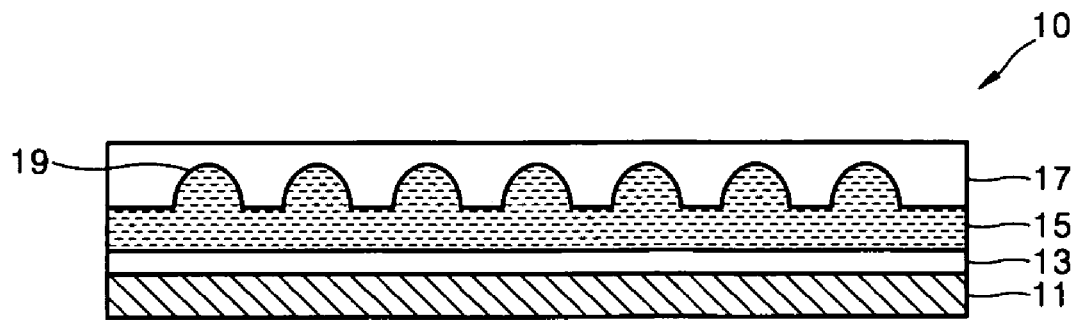
FIG. 1 is a cross-sectional view of a data storage medium according to a preferred embodiment of the present invention.

FIG. 1 is a cross-sectional view of a data storage medium according to a preferred embodiment of the present invention. Referring to FIG. 1, a data storage medium 10 includes a lower electrode 11, an insulation layer 13 deposited on the lower electrode 11, a photoelectron emission layer 15 deposited on the insulation layer 13 and having a plurality of protrusions 19 arranged on the top surface, and a dielectric layer 17 deposited on the photoelectron emission layer 15.

The lower electrode 11 and the photoelectron emission layer 15 are formed of a metal. In particular, the photoelectron emission layer 15 is preferably formed of a metal having a low work function, such as aluminium. The photoelectron emission layer 15 emits photoelectrons when an electric field having a predetermined potential is applied thereto, and the photoelectrons emitted from the photoelectron emission layer 15 are stored in the dielectric layer 17.

The dielectric layer 17 is formed of an amorphous dielectric material, for example, alumina $Al_2O_3$ or silicon nitride $Si_3N_4$, and prevents the photoelectrons emitted from the photoelectron emission layer 15 from being discharged in the air by trapping the photoelectrons in a predetermined region of the dielectric layer 17 where a defect has occurred. The predetermined region where the photoelectrons are trapped has an inverted phase and an increased amplitude, as compared with its neighboring regions. Therefore, it is possible to read data from the predetermined region by detecting the phase and the amplitude using a semiconductor probe including an FET.

The insulation layer 13 is located between the lower electrode 11 and the photoelectron emission layer 15 and prevents the photoelectrons emitted from the photoelectron emission layer 15 from leaking toward the lower electrode 11. The insulation layer 13 may be formed of a silicon oxide $SiO_2$ layer.

The data storage medium 10 may be formed as a thin film type. For example, the lower electrode 11 and the insulation layer 13 may be formed to have a thickness of 1-500 nanometers, the photoelectron emission layer 15 may be formed to have a thickness of 1-several micrometers, and the dielectric layer 17 may be formed to have a thickness of about 1-several micrometers.

FIGS. 2A through 2G are cross-sectional views illustrating a method of manufacturing a data storage medium according to a preferred embodiment of the present invention.

Figure 2A:
FIGS. 2A through 2G are cross-sectional views illustrating a method of manufacturing a data storage medium according to a preferred embodiment of the present invention.
Figure 2B:
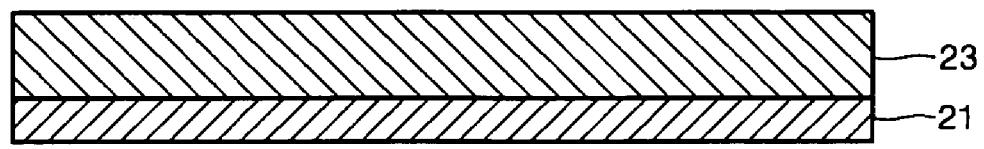
Figure 2C:

As shown in FIG. 2A, a dummy electrode 21 is prepared, and then a metal layer 23, for example, an aluminium layer, is deposited on the dummy electrode 21, as shown in FIG. 2B. Thereafter, as shown in FIG. 2C, the metal layer 23 is oxidized by using an anodising process, and thus a dielectric layer 17, for example, alumina ($Al_2O_3$), is formed having a plurality of holes.

Here, the anodising technique is an oxidization method, which involves applying electricity to a metal while using another metal as an anode so as to generate oxygen from the anode and forming a metal oxide film on the surface of the metal using the oxygen. In general, the anodising technique is used to oxidize aluminium by forming an alumina film on the surface of aluminium.

In the anodising process used in the present embodiment, a structure comprised of the dummy electrode 21 and the metal layer 23 is put in a sulphuric acid ($H_2SO_4$) solution or a phosphoric acid ($H_3PO_4$) solution having a concentration of 0.1-1 M. Then, the sulphuric acid solution or the phosphoric acid is decomposed by applying voltage to the dummy electrode 21. During the electrolysis, the metal layer 23 is oxidized, and finally, the metal layer 23 is converted into the dielectric layer 17 having a plurality of holes. For example, when aluminium changes into alumina, a plurality of holes are formed on the surface of alumina, as shown in FIG. 2C. In general, an anodizing process produces holes arranged in a honeycomb shape. However, it is possible to form holes to have a specific pattern other than a honeycomb pattern in an anodising process by using a mask.

Figure 2D:
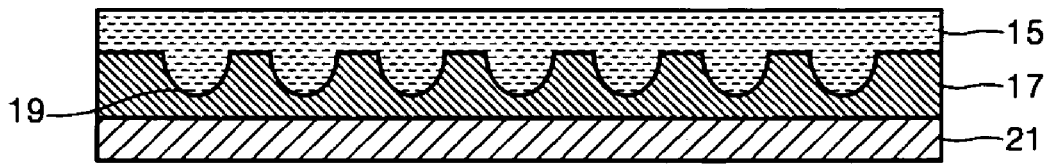
Figure 2E:
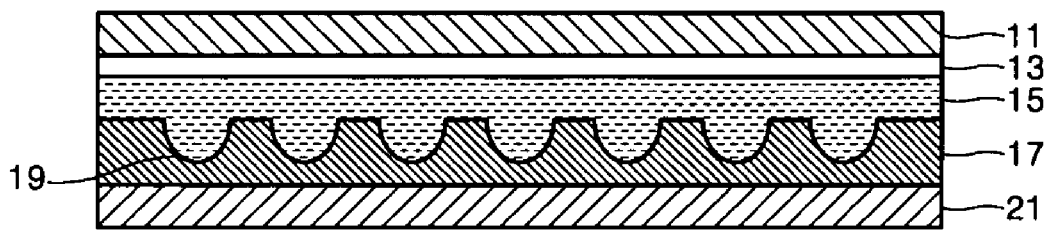

As shown in FIG. 2D, a photoelectron emission layer 15 formed of a metal is deposited on the dielectric layer 17 so that the holes formed on the dielectric layer 17 can be completely filled with the photoelectron emission layer 15. As shown in FIG. 2E, an insulation layer 13 and a lower electrode 11 are sequentially deposited on the photoelectron emission layer 15.

Figure 2F:
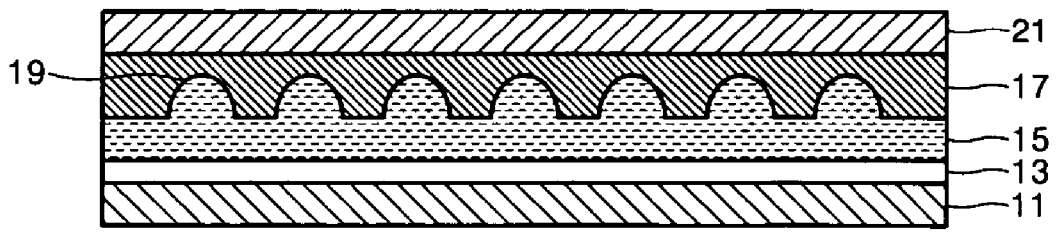
Figure 2G:
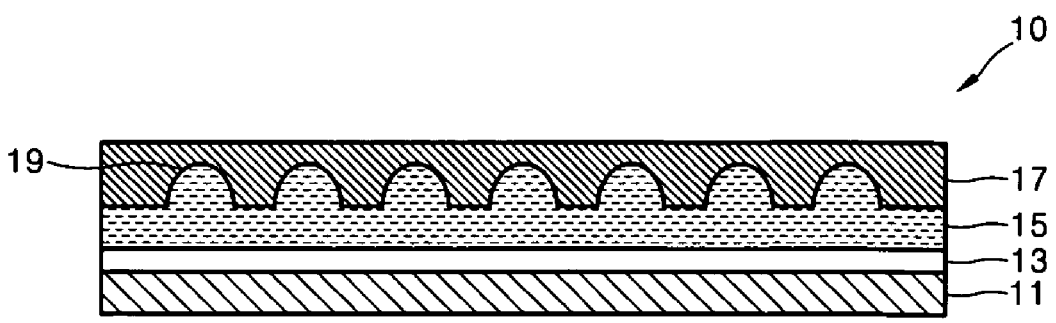

After the deposition, a structure where the dummy electrode 21, the dielectric layer 17, the photoelectron emission layer 15, the insulation layer 13, and the lower electrode 11 are sequentially stacked is turned upside down so that the dummy electrode 21 and the holes can face upward, as shown in FIG. 2F. Accordingly, the photoelectron emission layer 15 provides protrusions 19. Finally, as shown in FIG. 2G, the dummy electrode 21 is removed, thus completing a data storage medium. The dummy electrode 21 can be removed by chemical or physical etching.

Hereinafter, a data storage apparatus according to a preferred embodiment of the present invention will be described more fully with reference to FIG. 3. The data storage apparatus is used to write data on and read and erase data from the data storage medium according to the present invention shown in FIG. 1.

Figure 3:
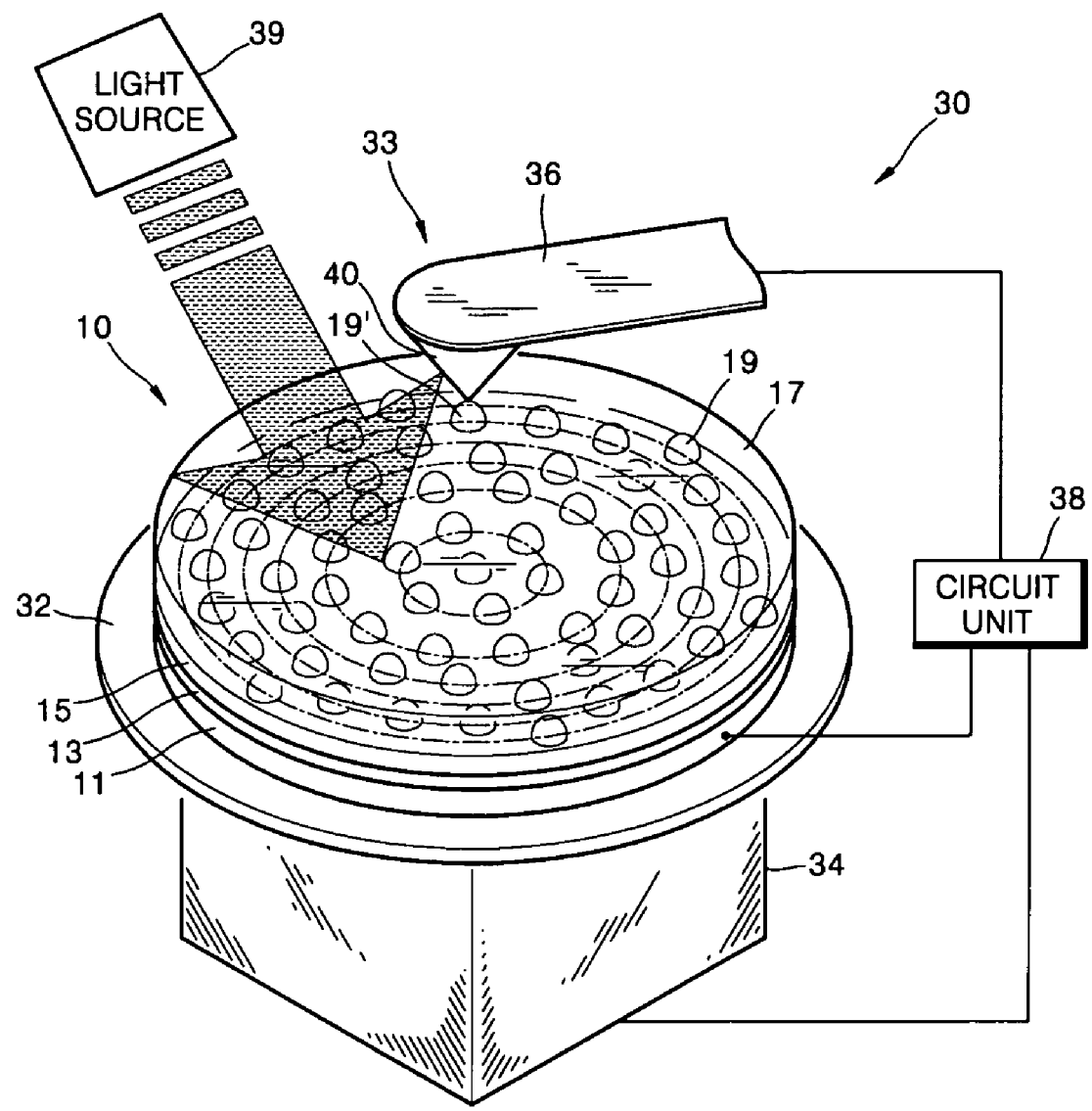
FIG. 3 is a diagram illustrating a data storage apparatus according to a preferred embodiment of the present invention.

FIG. 3 is a diagram illustrating a data storage apparatus according to a preferred embodiment of the present invention. Referring to FIG. 3, the data storage apparatus includes the data storage medium 10 according to the present invention shown in FIG. 1, a stage 32 supporting the data storage medium 10, a scanner 34 driving the state 32, a probe 33 used to write data on and read and erase data from the data storage medium 10 while in contact or out of contact with the top surface of the data storage medium 10, a circuit unit 38 applying a driving signal to the scanner 34, applying a data write signal and a data erase signal to the probe 33, detecting a data read signal, and applying voltage to the lower electrode 11 so as to generate an electric field between the data storage medium 10 and a tip 40, and a light source 39 irradiating light on the entire surface of the data storage medium 10 or on some of the plurality of protrusions 19 under the tip 40.

The data storage medium 10 is formed so that the protrusions 19 arranged on the surface of the data storage medium in a honeycomb pattern form a plurality of tracks. The protrusions are naturally arranged on the surface of the data storage medium in a honeycomb pattern by an anodising method. However, the arrangement pattern of the protrusions 19 is not limited to the honeycomb pattern set forth herein. Namely, the protrusions 19 may have a different arrangement pattern other than the honeycomb pattern. Photoelectrons may be stored in a predetermined region of the dielectric layer 17 corresponding to the protrusions 19, and photoelectrons stored in the upper part of a protrusion 19 at a specific location on a specific track may be used to store specific information. The specific information may include information on the data storage medium 10 and user information.

The data storage medium 10 according to the present invention is formed to include the protrusions 19 having a diameter of dozens of nanometers, and photoelectrons stored in the upper part of each of the protrusions 19 to store information occupy an area of several nanometers. Therefore, the data storage medium 10 can store data with a density of dozens to several hundreds of times higher than a conventional high-density data storage medium, for example, an optical data storage, such as a digital versatile disk, or a magnetic data storage, such as a hard disk.

The stage 32 supports the data storage medium 10 and can be driven in a track direction or a radial direction, which is perpendicular to the track direction, depending on the driving direction of the scanner 34 so that data can be written on and read and erased from the data storage medium 10.

The probe 33 includes the tip 40 used to write data on and read and erase data from the data storage medium 10 by forming an electric field with the data storage medium 10, and a cantilever 36 supporting the tip 40. In a case where the cantilever 36 is formed of a piezoelectric material and writes data on or reads and erase data from the data storage medium 10 while not in contact with the data storage medium 10, the circuit unit 38 preferably detects variations in the distance between the tip 40 and the surface of the data storage medium 10 and controls the cantilever 36 and the data storage medium 10 so that the distance between the tip 40 and the data storage medium 10 can be maintained at a predetermined level.

The tip 40 is formed having a cone shape or a pyramid shape so that the tip 40 has a decreasing width in a downward direction toward the data storage medium 10. The tip 40 is manufactured so that a strong electric field can be effectively generated between the peak of the tip 40 and a protrusion 19' facing the tip 40 and photoelectrons can be easily emitted from the protrusion 19' with the help of photons emitted from the light source 39. The shape and structure of the tip 40 will be described in greater detail with reference to FIGS. 4A and 4B.

The light source 39 can irradiate light on the entire surface of the data storage medium 10 or only on the protrusion 19' right under the tip 40. A laser irradiator or an ultraviolet ray irradiator can be used as the light source 39. The intensity of light emitted from the light source 39 can be appropriately adjusted depending on the electric field energy desired to be formed between the tip 40 and the data storage medium 10.

While in a conventional data storage apparatus using an FET tip, a strong voltage needs to be applied to the tip and a data storage medium to dielectrically polarize a dielectric layer of a data storage medium, in the data storage apparatus according to the present invention, the energy of light, which is emitted from the light source 39 and irradiated on the data storage medium 10 so that photoelectrons are emitted from the photoelectron emission layer 15, and electric energy, which is applied to the lower electrode 11 of the data storage medium 10 and the tip 40, are only required to be greater than a work function of the photoelectron emission layer 15. In other words, the data storage apparatus according to the present invention, unlike the conventional data storage apparatus, does not need much electric energy to dielectrically polarize the dielectric layer 17 of the data storage medium 10. Therefore, in the case of writing data on the data storage medium 10 using a conventional FET tip, the magnitude of voltage applied to the lower electrode 11 can be considerably decreased as compared with the prior art, and thus it is possible to prevent damage to the data storage medium 10 and a disturbance of the dielectric polarization of the dielectric layer 17, which are the problems with the prior art caused due to a strong electric field.

The circuit unit 38 controls the scanner 34 and the cantilever 36 and applies voltage to the lower electrode 11. In other words, the circuit unit 38 applies a driving signal to the scanner 34 so that the scanner 34 can be driven in a track direction or a radial direction. In addition, the circuit unit 38 detects a signal input from the cantilever 36 and then applies a control signal to the cantilever 36 so as to make the tip 40 maintain a predetermined distance with the data storage medium 10 when a value of the input signal exceeds a predetermined critical value. In the case of reading or erasing data from the data storage medium 10, the circuit unit 38 applies a predetermined voltage to the lower electrode 11 and the probe 33 so that an electric field can be generated between the tip 40 and the data storage medium 10.

Figure 4A:
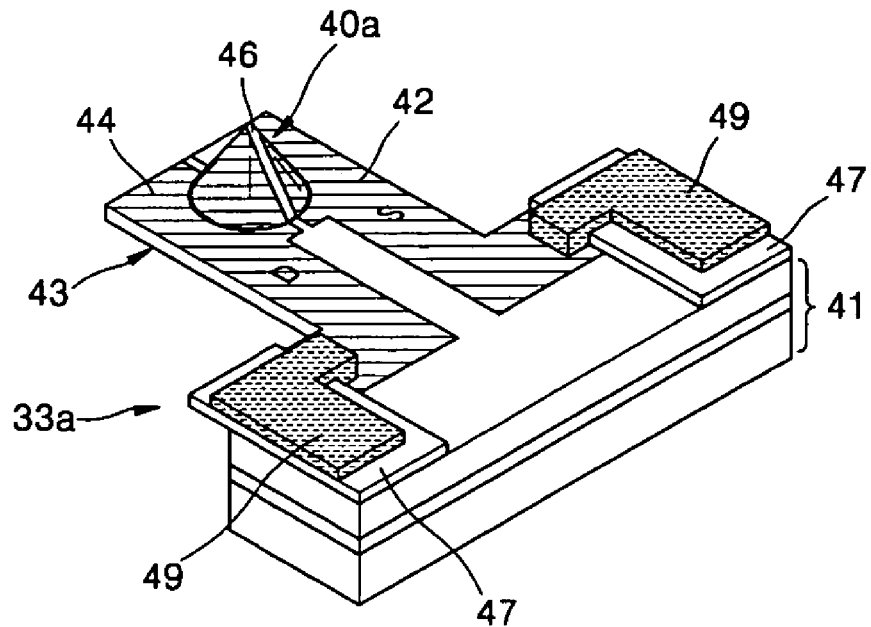
FIG. 4A is a perspective view of a probe according to a first embodiment of the present invention, included in a data storage apparatus according to a preferred embodiment of the present invention.
Figure 4B:
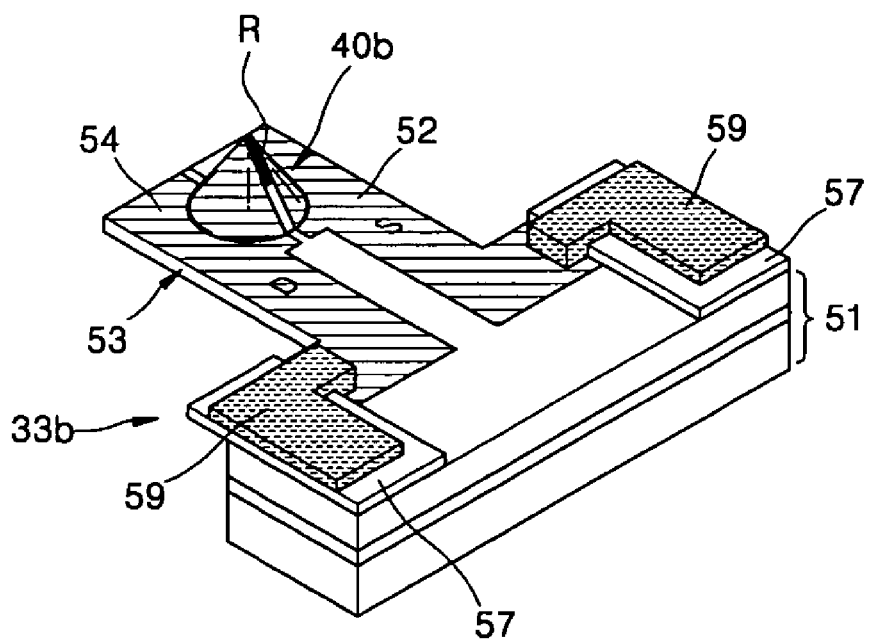
FIG. 4B is a perspective view of a probe according to a second embodiment of the present invention, included in a data storage apparatus according to a preferred embodiment of the present invention.

FIGS. 4A and 4B are perspective views of probes according to first and second embodiments, respectively, of the present invention included in a data storage apparatus according to a preferred embodiment of the present invention.

Referring to FIG. 4A, a probe 33a according to a first embodiment of the present invention has a structure where insulation layers 47 are respectively deposited on predetermined regions on the surface of a substrate 41 and electrodes 49 are respectively formed on the insulation layers 47 so as to be respectively connected to source and drain electrodes 42 and 44. A cantilever 43 extends from a silicon layer of the surface of the substrate 41, and a tip 40a, which is a cone-shaped, is formed on the surface of the cantilever 43 so that the tip 40a is perpendicular to the surface of the cantilever 43. The cantilever 43 is doped with the same impurities as the source and drain electrodes 42 and 44 and provides a carrier path 46 connected to the electrodes 49 via the source and drain electrodes 42 and 44. Reference numeral 46 is a channel between the source and drain electrodes 42 and 44.

A probe 33b according to a second embodiment of the present invention included in a data storage apparatus according to a preferred embodiment of the present invention will be described later.

Figure 5A:
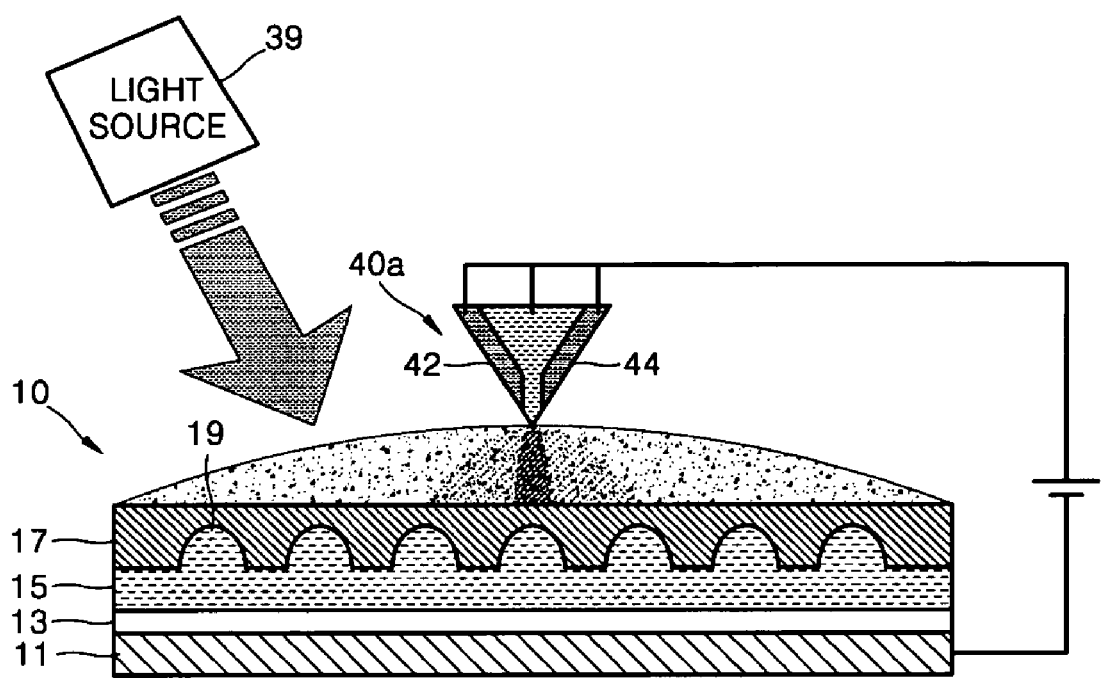
FIG. 5A is a cross-sectional view illustrating a method of writing data on a data storage medium according to a preferred embodiment of the present invention.

FIG. 5A is a diagram illustrating a method of writing data on the data storage medium according to the present invention using the data storage apparatus according to the present invention. A probe, which will be mentioned in the following paragraphs, is the same as the probe 33a shown in FIG. 4A.

Referring to FIG. 5A, the tip 40a of the probe 33a is placed over the data storage medium 10 to be in contact or out of contact with the surface of the data storage medium 10. Thereafter, voltages of the same magnitude are respectively applied to the source electrode 42, the drain electrode 44, and the tip 40a, and then photoelectrons of the photoelectron emission layer 15 are excited due to an electric field concentrated between the lower electrode 11 of the data storage medium 10 and the tip 40a. Thereafter, the light source 39 irradiates light on the data storage medium 10 so that photons collide with a protrusion 19 directly under the tip 40a and then photoelectrons are emitted from the protrusion 19. The photoelectrons emitted from the protrusion 19 are trapped in the dielectric layer 17 so that data can be written on the data storage medium 10.

Figure 5B:
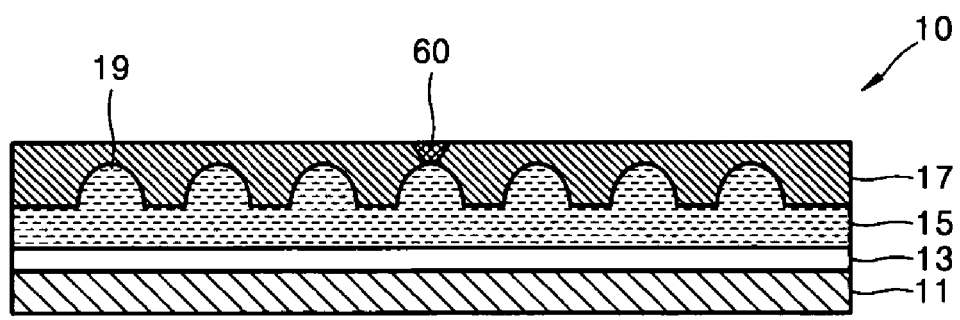
FIG. 5B is a cross-sectional view of a data storage medium according to a preferred embodiment of the present invention on which data are written.

FIG. 5B is a diagram illustrating data written on the data storage medium 10 where photoelectrons are trapped in the dielectric layer 17 by using the data storage apparatus according to the present invention. The photoelectrons are combined with one another in a predetermined region 60 corresponding to the top of the protrusion 19 and lacking electrons due to a lattice structure. Accordingly, the predetermined region 60 has different phase and amplitude from its neighboring regions.

Figure 6:
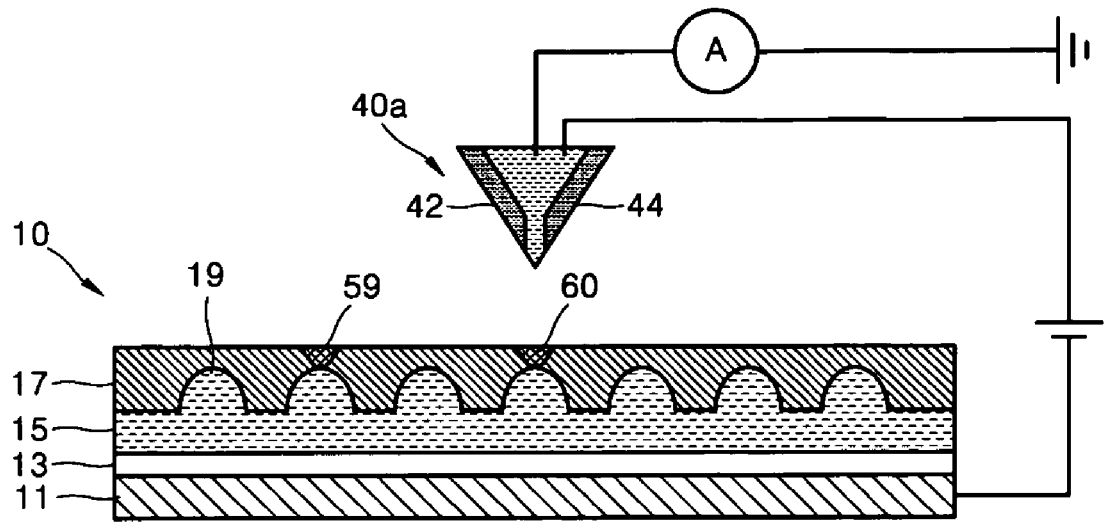
FIG. 6 is a cross-sectional view illustrating a method of reading data from a data storage medium according to a preferred embodiment of the present invention.

FIG. 6 is a diagram illustrating a method of reading data written on the data storage medium according to the present invention, as shown in FIG. 5B, by using the data storage apparatus according to the present invention. Referring to FIG. 6, the tip 40a is placed over the data storage medium 10 so as to be in contact or out of contact with the surface of the data storage medium 10. Then, photoelectrons in a predetermined region 59 generate a regional electric field so that an electron channel is generated at the peak of the tip 40a and current flows between the source and drain electrodes 42 and 44. Therefore, photoelectrons stored in the predetermined region 60 can be detected.

Figure 7:
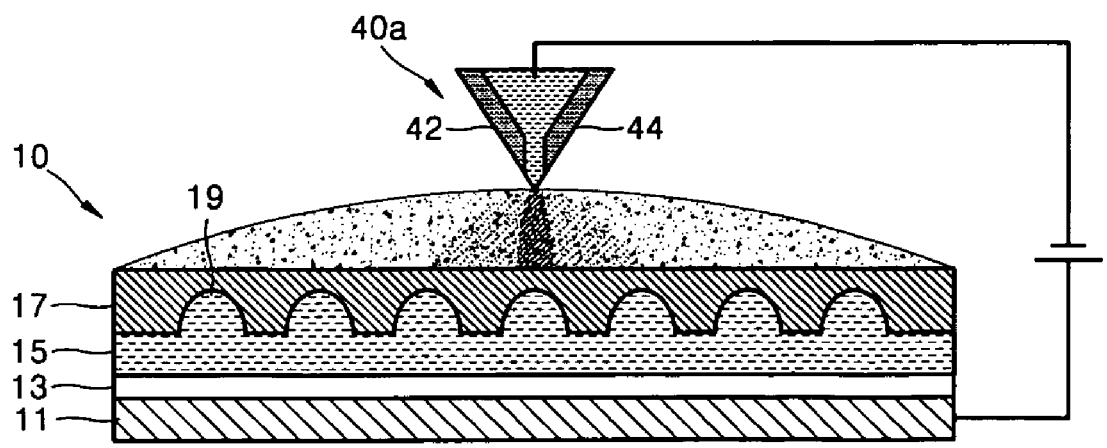
FIG. 7 is a cross-sectional view illustrating a method of erasing data written on a data storage medium according to a preferred embodiment of the present invention.

FIG. 7 is a diagram illustrating a method of erasing data written on the data storage medium according to the present invention, as shown in FIG. 5B, by using the data storage apparatus according to the present invention. Referring to FIG. 7, a voltage of the same magnitude as the voltage applied to the probe 33a and the lower electrode 11 when writing data on the data storage medium 10 is applied to the probe 33a and the lower electrode 11 in the opposite direction. Then, photoelectrons stored in the dielectric layer 17 are absorbed into the photoelectron emission layer 15 due to an electric field generated between the probe 33a and the lower electrode 11 so that data written on the data storage medium 10 can be erased.

When writing data on, and reading and erasing data from the data storage medium according to the present invention, a data storage apparatus including the probe 33b according to the second embodiment of the present invention can also be used.

Referring to FIG. 4B, the probe 33b according to the second embodiment of the present invention has a structure where insulation layers 57 are respectively deposited on predetermined regions on the surface of a substrate 51 and electrodes 59 are respectively formed on the insulation layers 57. A cantilever 53 extends from a silicon layer of the surface of the substrate 51, and a tip 40b, which is a cone-shaped, is formed on the surface of the cantilever 53 so that the tip 40b is perpendicular to the surface of the cantilever 53. Source and drain electrodes 52 and 54 doped with second impurities of a high concentration are formed along the side of the tip 40b, and a resistive region R doped with second impurities of a low concentration is located at the peak of the tip 40b. The source and drain electrodes 52 and 54 are respectively connected to the electrodes 59 via the cantilever 53.

Methods of writing data on and erasing data from a data storage medium using a data storage apparatus including the probe 33b according to the second embodiment of the present invention are the same as those described above with reference to FIG. 5A. However, a method of reading data from a data storage medium using the data storage apparatus including the probe 33b according to the second embodiment of the present invention is different from the one described with reference to FIG. 6.

Supposing that the source and drain electrode regions 52 and 54 are doped with n-type impurities of a high concentration and the resistive region R is doped with n-type impurities of a low concentration, a depletion region is formed in the resistive region R at the peak of the tip 40b due to an electric field generated by photoelectrons stored in a predetermined region of the data storage medium 10 over which the tip 40b is located. Since the depletion region serves as a nonconducting region, the area of the resistive region R decreases, and thus the resistance of the resistive region R increases. Therefore, it is possible to detect photoelectrons based on such a variation in the resistance of the resistive region R. If the tip 43b is located over a place where photoelectrons are not stored, the depletion region is not formed, and thus the resistance of the resistive region R rarely changes. Therefore, it is possible to detect where photoelectrons are located. Accordingly, a region where photoelectrons are detected is set to a data value of 1 and a region where photoelectrons are not detected is set to a data value of 0, or vice versa.

Figure 8A:
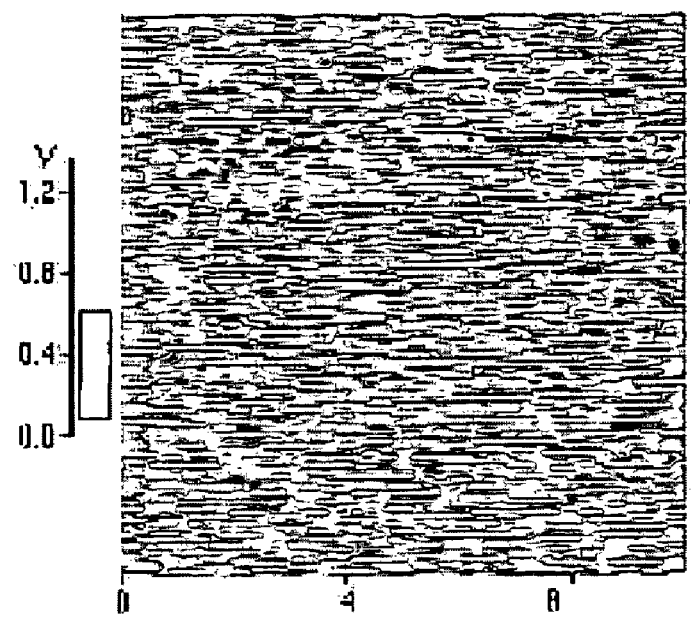
FIG. 8A is an electrostatic force microscopy (EFM) photograph showing the magnitude of an electric force generated by electrons stored in a data storage medium having an alumina dielectric layer formed on an aluminum electrode.
Figure 8B:
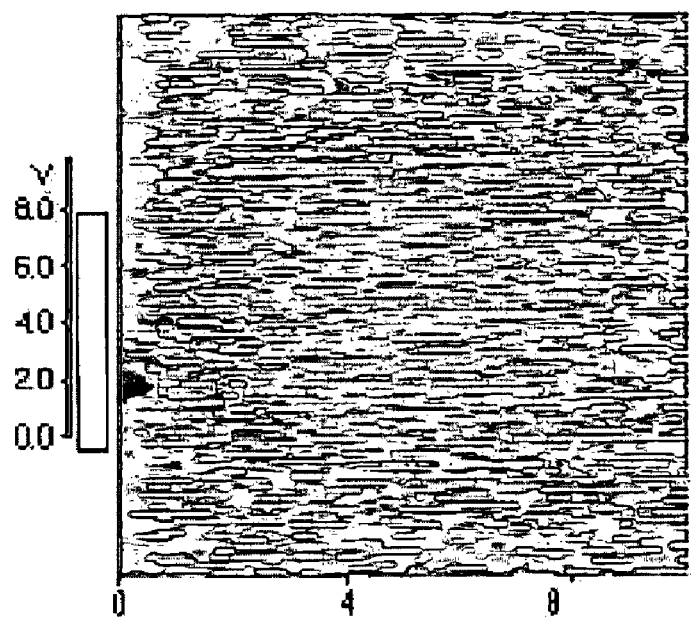
FIG. 8B is an EFM photograph showing the direction of the electric force generated by electrons stored in a data storage medium having an alumina dielectric layer formed on an aluminum electrode.

FIGS. 8A and 8B are electrostatic force microscopy (EFM) photos respectively showing the amplitude and phase of electrons stored in an alumina dielectric layer, when applying an electric field to a data storage medium where the alumina dielectric layer is deposited on a flat surface of an aluminium electrode having a flat surface, by using a data storage apparatus including the probe 33a according to the first embodiment of the present invention.

A bright region in FIG. 8A indicates a region where electrons have a greater amplitude compared to electrons in the neighboring regions. A bright region in FIG. 8B indicates a region where electrons have an inverse phase compared with electrons in the neighboring regions. In particular, the bright region has positive charge, and its neighboring regions have negative charge. Since even in the case of a data storage medium having a simple structure including a photoelectron emission layer and a dielectric layer without protrusions, electrons can be easily trapped in the dielectric layer by simply forming an electric field, it is reasonable to expect that photoelectrons can be more easily stored in a dielectric layer of a data storage medium having protrusions according to a preferred embodiment of the present invention by forming an electric field between a tip and the data storage medium and irradiating light on the data storage medium so as to make photoelectrons collide with the protrusions.

As described above, the data storage medium according to the present invention is capable of easily emitting photoelectrons due to the existence of protrusions having a size of several nanometers and arranged in any desired pattern. According to the present invention, it is possible to store data with a high density by providing a data storage medium on which a dielectric layer capable of storing photoelectrons is deposited.

In addition, according to the data storage apparatus of the present invention, photoelectrons are emitted from protrusions of a data storage medium by using electric energy between the data storage medium and a probe and light energy provided by a light source. Therefore, it is possible to realize a data storage apparatus having a high energy efficiency. In the case of a data storage apparatus driving a probe being out of contact with the data storage, there is no need to vacuum-package the data storage apparatus, and thus it is easy to manufacture the data storage apparatus.

Moreover, in the methods of writing data on, and reading and erasing data from the data storage medium according to the present invention by using the data storage apparatus according to the present invention, it is possible to drive the data storage apparatus while a probe is in contact or out of contact with the data storage medium. In particular, when driving the data storage apparatus while the probe is out of contact with the data storage medium, it is possible to reduce the possibility of the data storage medium being damaged and to increase the driving speed of the data storage apparatus. Therefore, it is possible to write data on, and read and erase data from the data storage medium at higher speeds.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of manufacturing a data storage medium, comprising:
    depositing a metal layer on a dummy electrode and forming a dielectric layer on which a plurality of holes are arranged by anodizing the metal layer;
    sequentially depositing a photoelectron emission layer, an insulation layer, and a lower electrode on the dielectric layer; and
    removing the dummy electrode.

2. The method of claim 1, wherein the photoelectron emission layer is formed of a metal.

3. The method of claim 1, wherein the dielectric layer is formed of an amorphous dielectric material.

4. The method of claim 1, wherein the dielectric layer is formed of alumina or silicon nitride.

* * * * *